United States Patent [19]

Wan et al.

[11] Patent Number: 6,030,495

[45] Date of Patent: Feb. 29, 2000

[54] METHOD FOR INCREASING BRIGHTNESS IN PULP PAPER AND POLYMERIC MATERIALS

[75] Inventors: Jeffrey K. S. Wan; M. Catherine Depew, both of Kingston, Canada

[73] Assignee: Queens's University at Kingston, Kingston, Canada

[21] Appl. No.: 08/946,793

[22] Filed: Oct. 8, 1997

Related U.S. Application Data

[63] Continuation-in-part of application No. 08/650,020, May 17, 1996, abandoned, which is a continuation-in-part of application No. 08/465,802, Jun. 6, 1995, abandoned, which is a continuation of application No. 08/261,275, Jul. 25, 1994, abandoned.

[51] Int. Cl.$^7$ ..................................................... D21H 17/09
[52] U.S. Cl. ......................... 162/82; 162/164.5; 162/177; 525/408; 527/300; 528/360; 536/59; 560/147
[58] Field of Search .................................... 162/82, 164.5, 162/177; 525/408; 527/300; 528/360; 536/59; 560/147

[56] References Cited

U.S. PATENT DOCUMENTS 4,066,392  1/1978  Abel .......................................... 8/127.5

OTHER PUBLICATIONS

Cole "Bleaching and Brightness Stabilization of High Yield Pulps" *Tappi Journal* Nov. 1987 pp. 117–122.

*Primary Examiner*—David Buttner
*Attorney, Agent, or Firm*—Richard J. Hicks

[57] ABSTRACT

Novel substantially odor-free polymeric thiol-containing antioxidant compounds suitable for preventing light induced brightness reversion or yellowing of pulps and papers and polymeric materials are described. The novel compounds are based on a polymeric backbone having thiolactate or thioglycolate groups grafted onto the ends thereof and are soluble in water or alcohol.

6 Claims, 4 Drawing Sheets

METHOD FOR INCREASING BRIGHTNESS IN PULP PAPER AND POLYMERIC MATERIALS

This application is a continuation-in-part of application Ser. No. 08/650,020, now abandoned filed May 17, 1996, which in turn is a continuation-in-part of application Ser. No. 08/465,802, now abandoned filed Jun. 6, 1995, which is a file wrapper continuation of application Ser. No. 08/261,275 filed Jul. 25, 1994 now abandoned.

FIELD OF INVENTION

This invention relates to the processes and compounds as anti-yellowing agents or additions for pulp paper and polymeric materials. More particularly this invention relates to thio-ester compounds for increasing and stabilizing brightness in chemimechanical pulps and papers.

BACKGROUND OF INVENTION

It is well known that several organosulfur compounds are effective agents for increasing and stabilizing brightness in chemimechanical pulps and papers. Indeed a survey of the effects of molecular structure of a variety of S-containing compounds on their efficiacies in such bleaching and brightness stabilization has been conducted by Cole and Sarkanen [Tappi 72, 117 (1987); they concluded that optimum results were effected by certain monomeric thiols such as 1-thioglycerol and glycol dimercaptoacetate, and that disulfides, sulfoxides, sulfones and most thioethers were relatively ineffective agents in comparison.

It has been demonstrated that many of the reactions involved in the photoyellowing processes in chemimechanical and thermomechanical pulps and papers are free radical in nature, and in particular result from photochemical reactions of lignin macromolecules to generate free radicals. It has also been demonstrated that oxy and peroxy radicals are particularly damaging intermediates in photoyellowing processes; it is presumed that the enhanced bleaching and protection against reversion afforded by thiols results from their well documented free radical scavenging and facile hydrogen donating abilities. However, monomeric thiols such as those described by Cole and Sarkanen are expensive and possess prohibitively noxious odours. In addition, once the thiol group has reacted the agent is no longer an active antioxidant; thus relatively high charges (~5–7%) must be used.

In previous ESR studies both in solution with model lignin chromophores and in bleached and unbleached papers the relatively high effectiveness of thiolactic acid in prevention of brightness reversion has been observed. The synergistic effects of compounds such as ascorbic acid in prolonging the effectiveness of thiols as antioxidants by repair of the initially oxidized SH group are well known and similar to the synergistic effects of ascorbic acid and phenolic antioxidants such as Vitamin E.

Without wishing to be bound by this hypothesis, it is believed that the presence of an α-carbonyl function, such as that found in thiolactic or thioglycolic acid may provide a route for repair of the thiol function in an analogous fashion prolonging the effective lifetime of the antioxidant and minimizing the necessary quantity added.

In order to mitigate the odour problem associated with thiolactic or thioglycolic acid and other thiols it is now proposed by the present invention to graft thiolactate or thioglycolic groups onto the ends of a polymeric backbone so as to produce a compound which is odourless, transparent and soluble in water, alcohols, acetone and toluene.

OBJECT OF INVENTION

Thus it is an object of the present invention to provide novel polymeric thioester compounds which are useful to prevent photo-yellowing of pulp and paper, which are soluble in selected solvents and which are relatively odour-free.

BRIEF STATEMENT OF INVENTION

Thus, by one aspect of this invention there is provided a substantially odour-free di-thiol graft to a water soluble polymer which comprises a polymeric backbone having thio-ester end groups grafted at the two terminal groups thereof.

By another aspect of this invention there is provided a process for stabilizing brightness of chemimechanical pulp and paper and polymeric materials comprising treating said pulp and paper with an effective amount of a substantially odour-free water soluble dithol polymer.

DETAILED DESCRIPTION OF PREFERRED EMBODIMENTS

Figure 1:
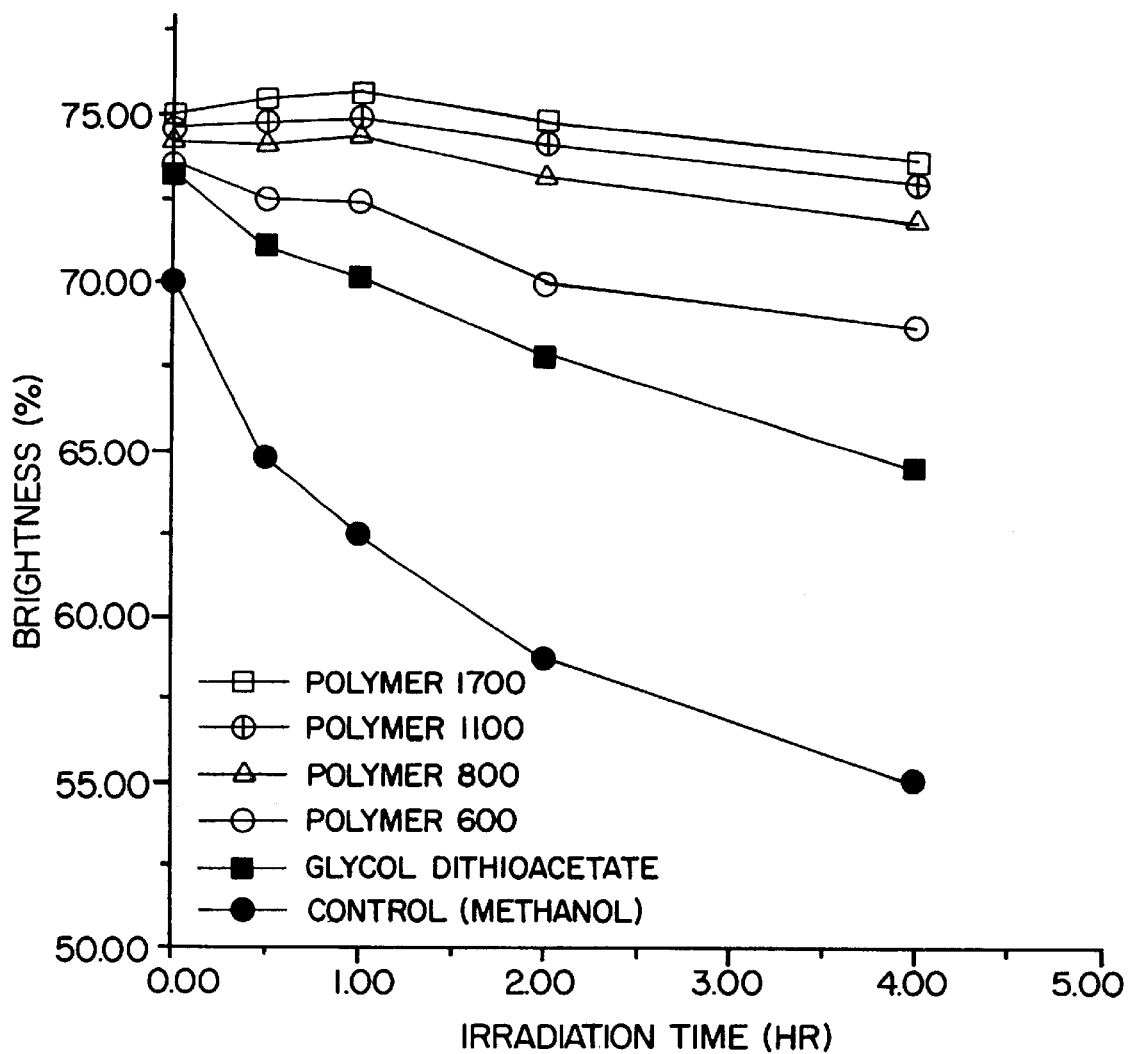
FIG. 1 is a graph illustrating the effect of selected polyethylene glycol dithiolactates on photoinduced brightness loss in bleached TMP paper.

Suitable grafting substrates for use in the present invention are polyether water soluble polymers which have thio-ester end groups grafted at the two terminal groups thereof This process is also known as "end-capping". Polyethers such as polyethylene, polypropylene and mixtures thereof are especially preferred. Cellulosic polymers may also be employed but polyamides are not particularly suitable. Preferably the molecular weight of the end-capped polyethylene glycol is in the range 200–4000, and most preferably in the range 600–1700.

Thiol substituents include those from thiolactic acid and thioglycolic acid. Other polymeric backbones have also been utilized, including polyvinyl alcohols (degree of substitution varying from 15%–85%. MW 10,000–20,000), and polymeric carbohydrate backbones including (but not limited to) soluble starch and cationic starch (contining tertairy amine groups). The thiol modified polyvinyl alcohols showed no efficacy in brightness reversion inhibition at loadings of 5–7%. The addition of thiol substituted starches to the pulp samples increased the initial brightness values as compared to the pulps/papers with a corresponding loading of the unsubstituted starch but did not appear to decrease the rate of brightness loss under subsequent irradiation at the loadings used (5–10%).

In order to illustrate the present invention more specifically thiol substituted polyethylene glycol (PEG) polymers with molecular weights varying between 600 and 3400 were synthesized. While most of the work reported herein has been done with thiolactate substituted PEG, it is to be noted that at the 2000 MW range, the thioglycolate substituted PEG gave essentially identical results. These polymers were designated as PGTL$_2$600, PGTL$_2$800, PGTL$_2$1100 and PGTL$_2$1700, having molecular weights of 600, 800, 1100 and 1700 respectively. PGTL$_2$600 and PGTL$_2$800 are viscous liquids while PGTL$_2$1100 and PGTL$_2$1700 are solids at room temperature. All polymers are soluble in alcohol and all but PGTL$_2$600 are water soluble. All are essentially odourless.

Synthesis of the polymers was effected by condensing 30 g of the polyethylene glycol with 2.5 equivalents of thiolactic acid in toluene (40 ml) under acidic conditions at 85–90° C. for 12 hours. At two hour intervals some water and toluene were removed under reduced pressure; additional toluene was then added to maintain the initial reaction volume. The yields of polyethylene glycol dithiolactates were between about 83% and 90%.

EXAMPLE 1

Treatment of TMP paper (Black Spruce) with polyethylene glycol dithiolactates.

Samples of bleached TMP paper (Paprican, Montreal) were treated with methanol solutions containing 3% PGTL$_2$600, 3.2% PGTL$_2$800, 4.3% PGTL$_2$-1100 and 6.7% PGTL$_2$1700 (all in wt %) respectively, so that the —SH group concentration in each test solution was the same (ie 0.062 mol/L). The samples were then dried, covered with a pyrex® plate and irradiated with a 200 W super pressure mercury lamp positioned 80 cm away for selected standardized periods of time up to about 6 hours. Diffuse Reflectance observations were made at 457 nm using a Labsphere RSA-HP-84 accessory coupled to an Oriel Multispec spectrometer. Control tests were also performed using methanol alone, and glycol dithioacetate. (NOTE the paper refers to thiolactic acid as well but FIG. 1 does not show this). The results are shown graphically in FIG. 1.

EXAMPLE 2

Treatment of bleached pulp with polyethylene glycol dithiolactates.

Samples of bleached pulps (Millar Western Pulp (Meadow Lake) Ltd.) were treated with aliquots of the test methanoic solutions as described in Example 1. The pulp samples were dried, exposed to uv light, and diffuse reflectance observations were made as in Example 1. The results are illustrated graphically in FIG. 2.

Figure 2:
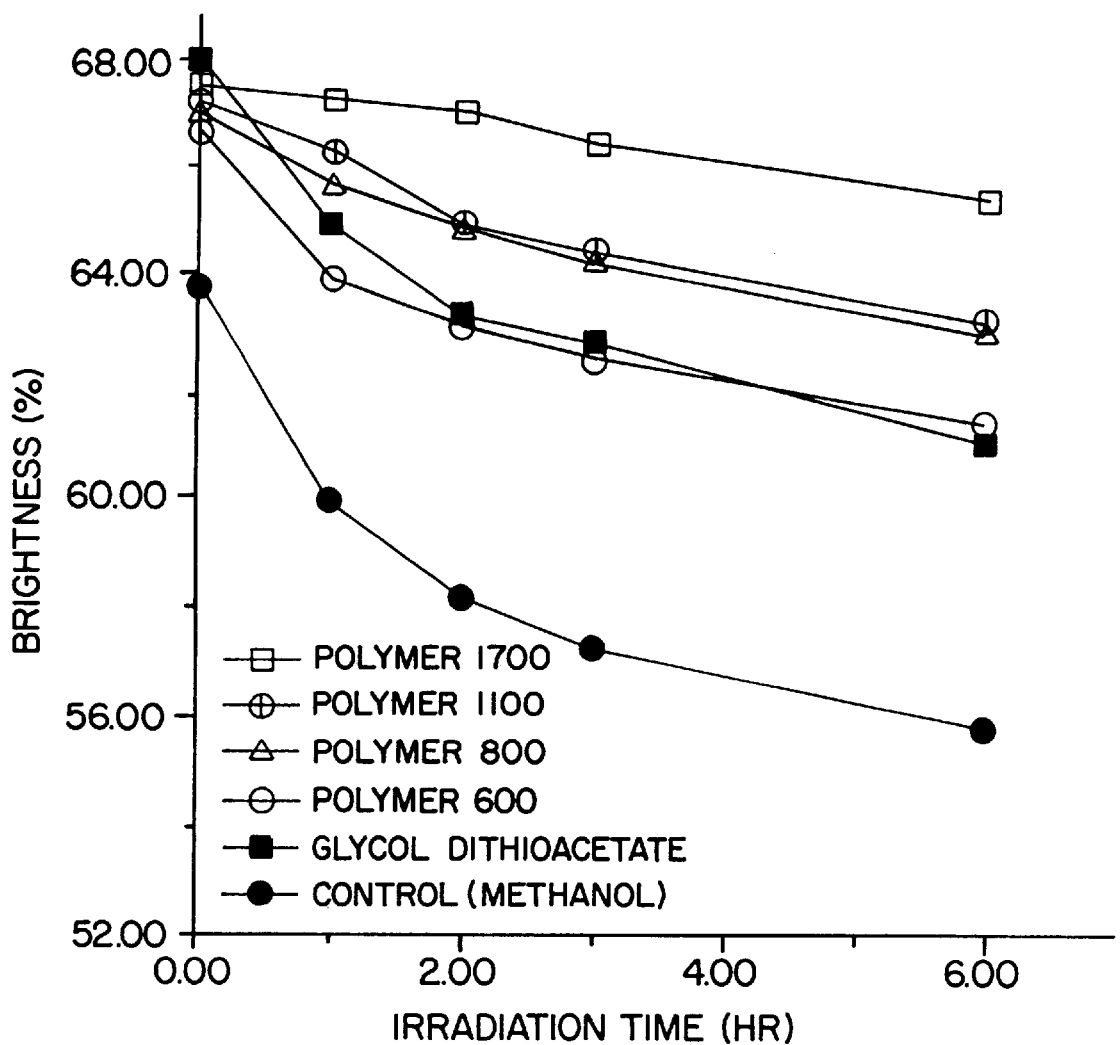
FIG. 2 is a graph illustrating the effect of the polyethylene glycol thiolactates of FIG. 1 on photoinduced brightness loss in bleached pulp.

As can be seen from FIGS. 1 and 2 the results with pulp are very similar to those achieved with paper. Over a period of 4 hours of irradiation the PGTL$_2$-1700 polymer lost only 1.3 points in brightness and PGTL$_2$-400 lost 2.3 and 4.6 points respectively. In contrast papers treated with glycol dimercaptoacetate lost 8.7 and the untreated control lost 15.2. While the reason for the differences in prevention of brightness reversion with polymer chain length is uncertain, it is believed that water solubility and chain length compatibility with pore size may be responsible.

Synthesis of PEG-SH

One equivalent of PEG was condensed with 2.5 equivalents of thiol (thiolactic acid) in a minimum amount of toluene necessary for dissolution. A catalytic amount of concentrated sulphuric acid was added (0.05 mL) and the solution heated (80–90° C.) with stirring for 12 h. The solvent was removed under vacuum, and the residue diluted with diethyl either and stirred until crystallization occurred. The product was filtered, washed with hexane, and dried under vacuum. Yields were typically in excess of 95%.

Essentially similar results were obtained with thioglycolic acid substituted for thiolactic acid, and the graph for PEG-SH 2200 overlapped therewith.

Typical loadings of 5% by weight of, for example, polymer PEG-SH 2000 effect an increase in initial brightness of 4–5 ISO brightness points (ISO Brightness=Diffuse Reflectance measured at 457 nm) in bleached CTMP (chemithermomechanical pulp), with a period of substantial inhibition of yellowing under high intensity irradiation ($\lambda$>300 nm) lasting in excess of 4 hr. (These results have been independently determined to be comparable to irradiations of durations of 36 h or greater with either ultraviolet (Rayonet RPR-100), or intense simulated daylight (Xenotest).

Figure 3:
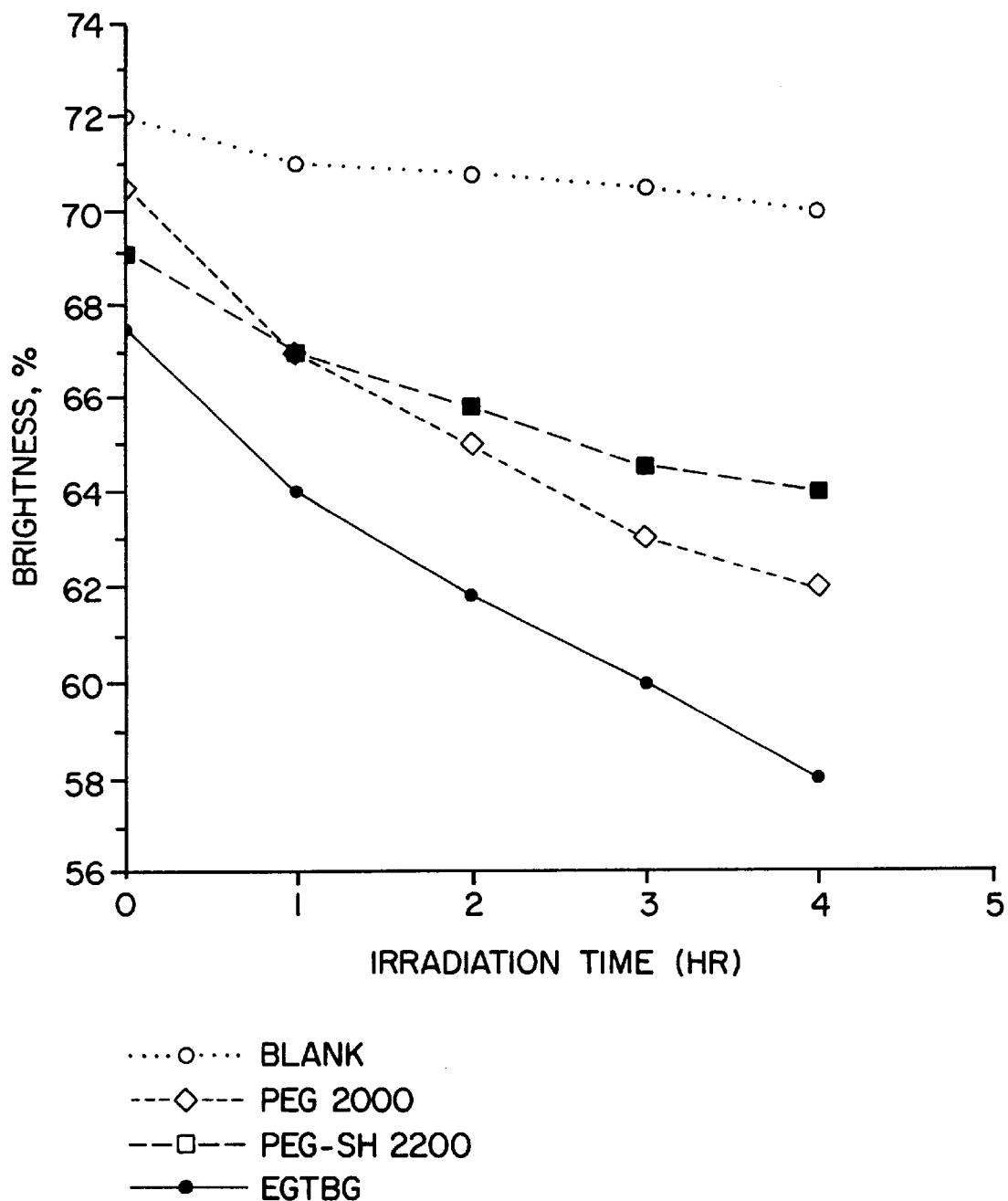
FIG. 3 is a graph, similar to FIG. 1, illustrating the effect of additional selected polyethylene glycol-thiolactates or thioglycolates on photo-induced brightness loss in bleached TMP paper.

These results are shown in FIG. 3, where the effects on brightness reversion inhibition, as well as the initial increased brightness for thiol (thiolactate or thioglycolate) substituted PEG (PEG-SH 2200) are compared with the untreated pulp (blank), pulp treated with 5% unmodified PEG 2000, and a typical monomeric thiol EGTBG (ethylene thiol bisthioglycolate 1.5%). Note that for a MW of polymer 2000, the thiol substituted polymer has a MW of 2200 (for thiolactate substitution) and a 5% load consists of a thiol content of 0.5%.

The pulps used in these studies include Hydrogen peroxide bleached spruce CTMP (Bromptonville, Queen's, obtained from Paprican), recycled deinked pulp from Fletcher Challenge (Vancouver), Bleached CTMP (Elk Falls, B.C., Fletcher Challenge), and bleached TMP (Millar Western Pulp Ltd., Meadow Lake). In each case the thiol substituted polymers gave similar results, i.e. 2–5 points initial brightness increase, a period of protection of the pulp from yellowing under 4 h high intensity irradiation which amounted to an effective 10 point brightness differential as compared to unprotected pulps.

Pulp samples were prepared for irradiation by first drying and slightly grinding the chosen pulp. The desired loading of polymer is added in aqueous solution, then the pulp sample is pressed into thick sheet. The sheets were then placed 80 cm in front of a super pressure 200 W mercury lamp filtered to remove wavelengths less than 300 nm and irradiated for periods of up to 4 h. The intensity of the lamp was reduced by 30% using layers of metal screening.

Diffuse relectance observations were made at 457 mn using a Labsphere RSA-HP-84 accessory coupled to an Oriel Multispec spectrometer.

Figure 4:
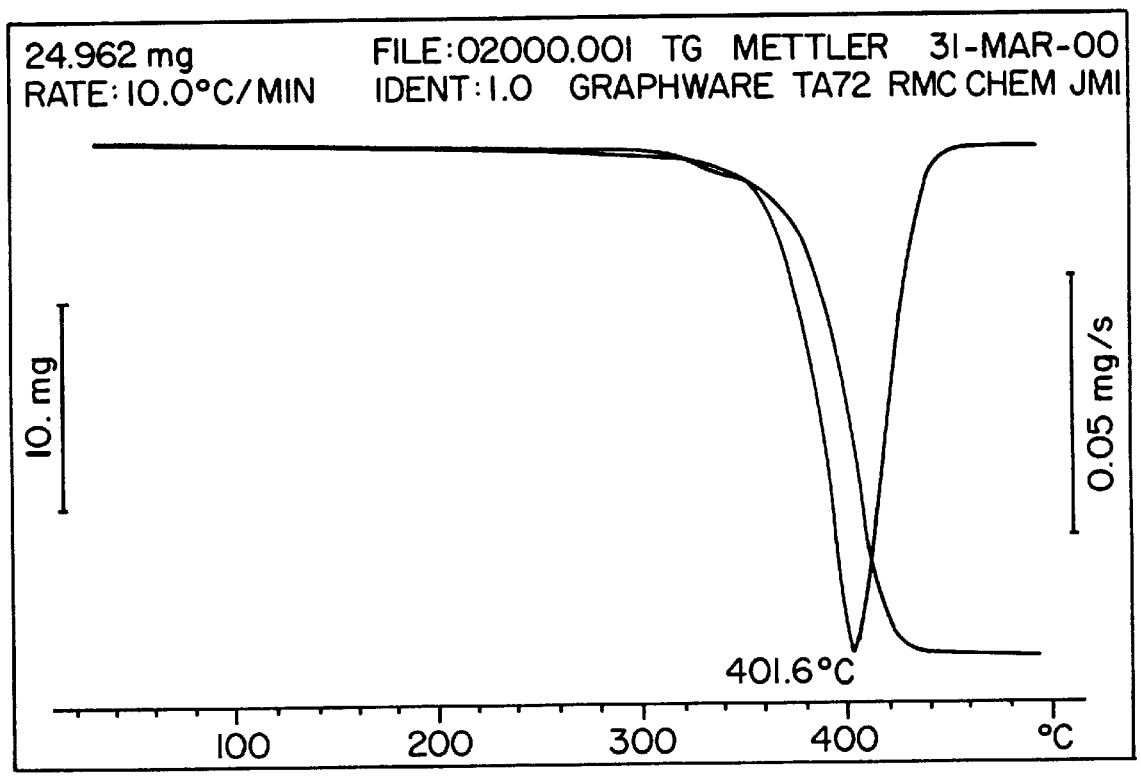
FIG. 4 is a graph of thermal gravimetric analysis of PEG-SH2200.

The principal advantages of the thiol substituted polymers over monomeric thiol inhibitors include the following:

a. the modified polymers are essentially odourless, or possess only a mild odour.

b. except for the polymer made from PEG 400 the products are solids and are readily water soluble.

c. the polymers are thermally stable—thermal gravimetric analysis of PEG-SH 2200 shows no degradation below 375° C. (see FIG. 4).

Note, that this suggests application as a potential antioxidant in FIG. 2 many other materials including polymers.

d. the polymers are also photochemically inert in aqueous solution showing no degradation after 12–24 h of irradiation.

e. the synthetic route for preparation of the polymers is a simple, one step reaction with facile purification.

Modifications using other effective thiol, disulphide, or phenolic antioxidants would be simple.

f. unlike antioxidants such as ascorbic acid, the PEG-SH polymers have been shown to cause no thermal darkening of pulps and papers. This is very important since the paper rolls or packages are often stored during shipping etc. for considerable periods before exposure to light during use.

g. spraying of the PEG-SH's onto pulp/papers after they have been irradiated and yellowed returns the pulps/papers to brightness values at or closely approaching those prior to irradiation.

While this invention makes particular reference to pulps and paper, the thiolester polymers of the invention may also be used to improve brightness, particularly initial brightness of polymeric plastic materials such as polyamides, polyethylene and polypropylene, and in particular nylon.

It will be appreciated by those skilled in the art that the method of irradiation with high intensity uv light to cause accelerated yellowing of the samples is not strictly comparable to yellowing under natural daylight conditions. However, these experiments strongly indicate the dramatic enhancement of protection against reversion afforded by the polyethylene glycol dimercaptolactates even in comparison to glycol dimercaptolactate, which with 1-thioglycerol, has heretofore provided the best results. Without wishing to be bound by this explanation, it is believed that the special molecular structure of the thiolactates and thioglycolates both of which have a carbonyl adjacent to the thiol group is significant, allowing not only simple radical scavenging by the thiol forming a relatively stable thiol radical, but also subsequently avenues for regeneration of the thiol group prolonging its activity.

We claim:

1. A process for stabilizing brightness of chemimechanical pulp or paper comprising treating said pulp or paper with an effective amount of a substantially odour-free dithiolactate graft to a water soluble polymer.

2. A process as claimed in claim 1 wherein said polymer is selected from the group consisting of polyalkylene and cellulosic polymers.

3. A process as claimed in claim 2 wherein said polyalkylene polymer is a polyethylene glycol dithiolactate, having a molecular weight in the range of 600 to 1700.

4. A process as claimed in claim 3 wherein said polyethylene glycol dithiolactate is added to said pulp or paper in an amount sufficient to provide 0.062 mols/L of —SH groups.

5. A process as claimed in claim 4 wherein said polyethylene glycol dithiolactate is in an aqueous solution.

6. A process as claimed in claim 4 wherein said polyethylene glycol dithiolactate is in an alcoholic solution.

* * * * *